US011236940B2

(12) United States Patent
Ahmed et al.

(10) Patent No.: US 11,236,940 B2
(45) Date of Patent: Feb. 1, 2022

(54) EGG BOILER DEVICE FOR A REFRIGERATOR APPLIANCE

(71) Applicant: Haier US Appliance Solutions, Inc., Wilmington, DE (US)

(72) Inventors: Syed Moin Ahmed, Hyderabad (IN); Gaurav Kumar Verma, Hyderabad (IN); Sharath Chandra Prasad, Hyderabad (IN); Praveena Alangar Subrahmanya, Karnataka (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 183 days.

(21) Appl. No.: 16/568,497

(22) Filed: Sep. 12, 2019

(65) Prior Publication Data

US 2021/0080169 A1 Mar. 18, 2021

(51) Int. Cl.
| | |
|---|---|
| F25D 23/12 | (2006.01) |
| A23L 5/10 | (2016.01) |
| A47J 29/02 | (2006.01) |
| F25D 23/04 | (2006.01) |
| A23L 15/00 | (2016.01) |
| A47J 29/06 | (2006.01) |

(52) U.S. Cl.
CPC ............... *F25D 23/12* (2013.01); *A23L 5/13* (2016.08); *A23L 15/00* (2016.08); *A47J 29/02* (2013.01); *A47J 29/06* (2013.01); *F25D 23/04* (2013.01); *A23V 2002/00* (2013.01); *F25D 2331/807* (2013.01); *F25D 2400/02* (2013.01)

(58) Field of Classification Search
CPC .... F25D 23/12; F25D 23/04; F25D 2331/807; F25D 2400/02; F25D 2700/06; F25D 2700/16; A23L 5/13; A23L 5/10; A23L 15/00; A47J 29/02; A47J 27/10; A47J 27/18; A47J 27/21–27/212; A47J 29/00–29/06; A47J 2202/00; A47J 37/1233–37/1238; A23V 2002/00
See application file for complete search history.

(56) References Cited

U.S. PATENT DOCUMENTS

| | | | | |
|---|---|---|---|---|
| 2,091,292 A | * | 8/1937 | Scurlock | ............... F25D 25/027 165/58 |
| 2,174,299 A | * | 9/1939 | Whitney et al. | ........ F25B 15/06 165/58 |
| 2,341,872 A | * | 2/1944 | Kasold | .................. F25D 23/126 165/63 |

(Continued)

FOREIGN PATENT DOCUMENTS

| | | |
|---|---|---|
| CN | 2804749 Y | 8/2006 |
| CN | 201523982 U | 7/2010 |
| CN | 203447119 U | 2/2014 |

*Primary Examiner* — Drew E Becker
(74) *Attorney, Agent, or Firm* — Dority & Manning, P.A.

(57) ABSTRACT

An egg boiler device for a refrigerator appliance is provided. In one aspect, a refrigerator appliance has a refrigerator door that defines a dispenser recess. The egg boiler device includes an end cap and a canister for receiving one or more eggs for cooking. The egg boiler device is positioned within the dispenser recess and the end cap is mounted to a dispenser assembly. A dispenser of the dispenser assembly directs a volume of heated water into the egg boiler device. The heated water imparts thermal energy to the eggs, and consequently, the eggs are cooked.

20 Claims, 6 Drawing Sheets

(56) References Cited

U.S. PATENT DOCUMENTS

| | | | | |
|---|---|---|---|---|
| 2,368,496 A * | 1/1945 | Sharp | A47J 29/04 | 99/336 |
| 2,504,794 A * | 4/1950 | Berman | F25D 23/12 | 165/267 |
| 2,597,745 A * | 5/1952 | Morrison | F25D 23/12 | 165/240 |
| 2,823,972 A * | 2/1958 | Saunders | F25D 23/04 | 312/311 |
| 3,280,304 A * | 10/1966 | Motoki | A47J 29/02 | 219/441 |
| 3,577,908 A * | 5/1971 | Burg | A47J 29/02 | 99/333 |
| 3,888,303 A * | 6/1975 | Skala | F25D 31/005 | 165/300 |
| 4,261,328 A * | 4/1981 | Kirk | A47J 29/06 | 126/392.1 |
| 5,445,062 A * | 8/1995 | Polster | A47J 27/10 | 366/107 |
| 5,511,388 A * | 4/1996 | Taylor | B01D 5/0039 | 62/238.5 |
| 5,603,230 A * | 2/1997 | Tsai | B67D 3/0009 | 62/331 |
| 7,610,849 B2 * | 11/2009 | Bigge | A47J 31/36 | 62/390 |
| 9,108,788 B2 * | 8/2015 | Nelissen | A23L 5/13 | |
| 2005/0178273 A1 * | 8/2005 | Meuleners | B67D 1/0858 | 99/279 |
| 2005/0244566 A1 * | 11/2005 | Poltnikov | A47J 29/02 | 426/614 |
| 2007/0023451 A1 * | 2/2007 | Bordino | B67D 3/0061 | 222/146.5 |
| 2008/0041237 A1 * | 2/2008 | Bonsell | A47J 29/04 | 99/328 |
| 2008/0314258 A1 * | 12/2008 | Martin | A47J 29/02 | 99/329 R |
| 2011/0088564 A1 * | 4/2011 | Bonsell | A47J 29/04 | 99/336 |
| 2012/0102993 A1 * | 5/2012 | Hortin | B67D 1/0888 | 62/189 |
| 2013/0196039 A1 * | 8/2013 | Nelissen | H05B 6/80 | 426/233 |
| 2014/0270724 A1 * | 9/2014 | Hall | F25D 23/028 | 392/341 |
| 2014/0270725 A1 * | 9/2014 | Bertolini | B67D 7/82 | 392/341 |
| 2016/0131414 A1 * | 5/2016 | Akan | F25D 23/025 | 312/404 |
| 2016/0286847 A1 * | 10/2016 | Villemaire | A23B 4/07 | |
| 2017/0119194 A1 * | 5/2017 | Nelissen | A23L 5/15 | |
| 2017/0245675 A1 * | 8/2017 | Junge | A47J 31/401 | |
| 2017/0336133 A1 * | 11/2017 | King | F25D 29/005 | |
| 2018/0084938 A1 * | 3/2018 | Sakthivel | F25D 23/04 | |
| 2019/0086143 A1 * | 3/2019 | Liss | A23L 5/13 | |
| 2019/0120478 A1 * | 4/2019 | Lux | F21V 33/0044 | |
| 2020/0093320 A1 * | 3/2020 | Thomas | F25D 23/12 | |
| 2020/0390266 A1 * | 12/2020 | Garman | A47J 29/06 | |
| 2021/0076862 A1 * | 3/2021 | Gardner | F25D 17/04 | |

* cited by examiner

EGG BOILER DEVICE FOR A REFRIGERATOR APPLIANCE

FIELD OF THE INVENTION

The present subject matter relates generally to refrigerator appliances, and more particularly to an egg boiler device for a refrigerator appliance.

BACKGROUND OF THE INVENTION

Conventionally, users have cooked eggs using many different types of devices, such as electric egg cookers, egg steamers, in a frying pan over a cooktop appliance, etc. Most of these egg-cooking devices are stand-alone products that take up value cabinet or countertop space. In some instances, egg boiler devices have been integrated into refrigerator appliances. However, such devices have proven unsatisfactory and are generally not removable from the refrigerator appliance or accessible without opening the refrigerator door.

Accordingly, a refrigerator appliance having features for dispensing heated water into an egg boiler device that addresses one or more of the challenges noted above would be useful.

BRIEF DESCRIPTION OF THE INVENTION

Aspects and advantages of the invention will be set forth in part in the following description, or may be apparent from the description, or may be learned through practice of the invention.

In one aspect, a method of cooking eggs at a refrigerator appliance in a cooking operation is provided. The method includes detecting an egg boiler device mounted within a dispenser recess of the refrigerator appliance, the egg boiler device having one or more eggs loaded therein. In response to detecting the egg boiler device within the dispenser recess, the method also includes directing a volume of heated water into the egg boiler device such that the volume of heated water imparts thermal energy to the one or more eggs loaded into the egg boiler device.

In another aspect, a refrigerator appliance is provided. The refrigerator appliance includes a cabinet defining a chilled chamber and a door mounted to the cabinet. The door defines a dispenser recess. The refrigerator appliance further includes a dispenser mounted to the door. Moreover, the refrigerator appliance includes a heating device disposed within the cabinet for heating water. In addition, the refrigerator appliance includes an egg boiler device containing one or more eggs, the egg boiler device positioned within the dispenser recess and mounted to the dispenser such that a volume of heated water from the heating device is receivable within the egg boiler device to impart thermal energy to the one or more eggs.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
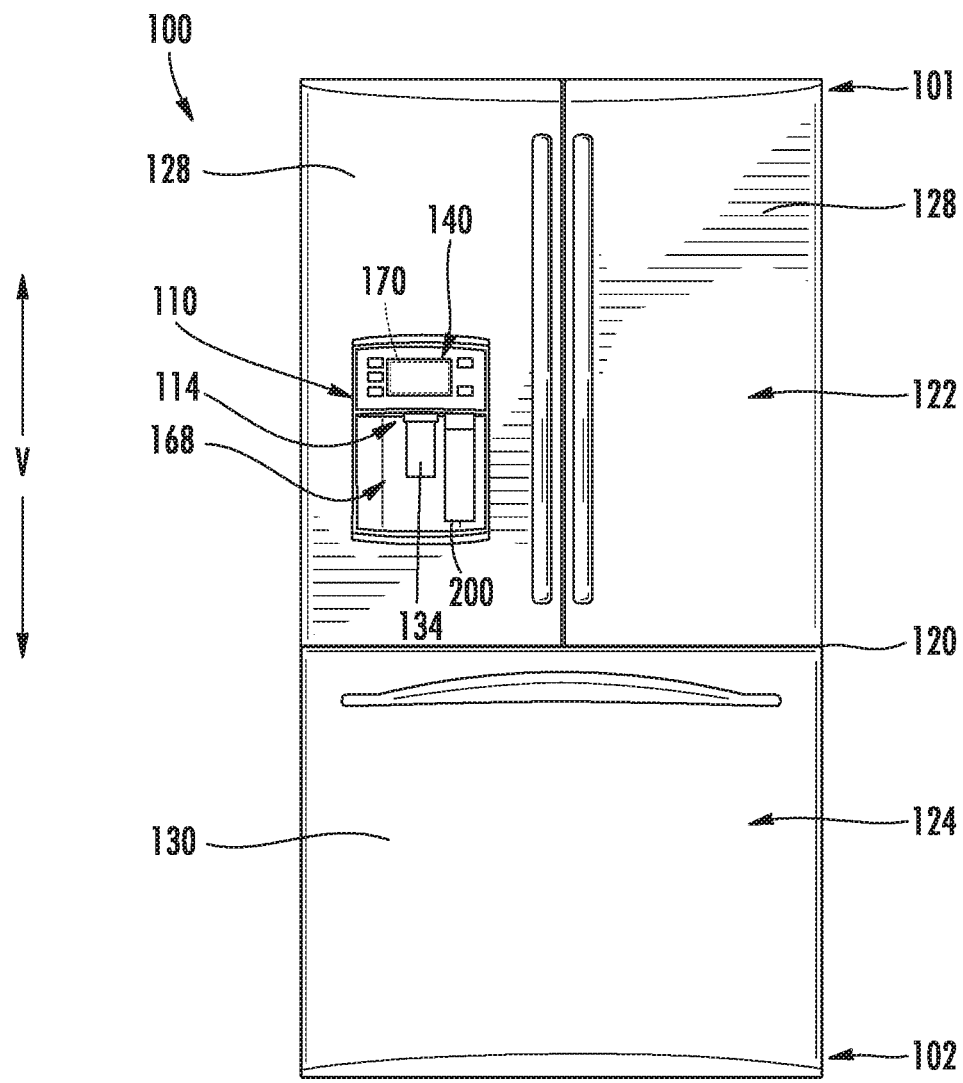
FIG. 1 provides a front, elevation view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, elevation view of a refrigerator appliance 100 according to an exemplary embodiment of the present subject matter. Refrigerator appliance 100 illustrated in FIG. 1 is generally referred to as a bottom-mount refrigerator appliance. However, it should be understood that refrigerator appliance 100 is provided by way of example only. Thus, the present subject matter is not limited to refrigerator appliance 100 and may be utilized in any suitable refrigerator appliance. For example, one of skill in the art will understand that the present subject matter may be used with side-by-side style refrigerator appliances or top-mount refrigerator appliances as well.

Refrigerator appliance 100 includes a housing or cabinet 120. Cabinet 120 extends between an upper portion 101 and a lower portion 102 along a vertical direction V. Cabinet 120 defines chilled chambers, e.g., a fresh food compartment 122 positioned adjacent upper portion 101 of cabinet 120 and a freezer compartment 124 arranged at lower portion 102 of cabinet 120. Cabinet 120 also defines a mechanical compartment (not shown) for receipt of a sealed cooling system for cooling fresh food compartment 122 and freezer compartment 124.

Refrigerator doors 128 are rotatably hinged to cabinet 120 proximate fresh food compartment 122 in order to permit selective access to fresh food compartment 122. A freezer door 130 is arranged below refrigerator doors 128 for accessing freezer compartment 124. Freezer door 130 is mounted to a freezer drawer (not shown) slidably coupled within freezer compartment 124.

Refrigerator appliance 100 also includes a dispensing assembly 110 for dispensing various fluids, such as water and/or ice, to a dispenser recess 168 defined by one of refrigerator doors 128. Dispensing assembly 110 includes a dispenser 114 positioned on an exterior portion of refrigerator appliance 100. Dispenser 114 includes several outlets for accessing ice, chilled liquid water, and heated liquid water. For this embodiment, to access ice, chilled water, and/or heated water, dispensing assembly 110 includes a paddle 134 mounted below a chilled water outlet, a heated water outlet, and an ice outlet. As an example, a user can urge a container, such as a cup, against paddle 134 to initiate a flow of chilled water, heated water and/or ice into the container within dispenser recess 168. A control panel or user interface panel 140 may be provided for controlling the mode of operation of dispenser 114, e.g., for selecting chilled water, heated water, crushed ice and/or ice cubes. User interface panel 140 can include a chilled water dispensing button (not labeled), an ice-dispensing button (not labeled), and a heated water dispensing button (not labeled) for selecting between chilled water, ice, and heated water, respectively.

The outlets of dispenser 114 and paddle 134 may be an external part of dispenser 114, and are positioned at or adjacent dispenser recess 168. Dispenser 114 is positioned at a predetermined elevation convenient for an adult user to access ice or water, e.g., enabling the user to access ice without the need to bend-over and without the need to access freezer compartment 124. In the exemplary embodiment, dispenser 114 is positioned at a level that approximates the chest level of an adult user.

Operation of the refrigerator appliance 100 can be regulated by a controller 170 that is operatively or communicatively coupled to user interface panel 140 and/or various operational components of dispensing assembly 110 as discussed below. User interface panel 140 provides selections for user manipulation of the operation of refrigerator appliance 100 such as e.g., selections between whole or crushed ice, chilled water, and other various options. In response to user manipulation of the user interface panel 140 and/or sensor signals, controller 170 may operate various components of the refrigerator appliance 100. Controller 170 can include one or more memory devices and one or more processing devices. The one or more memory devices can include a non-transitory computer readable media, FLASH, RAM, ROM, or electrically erasable, programmable read only memory (EEPROM). The one or more processing devices can include one or more microprocessors, CPUs or the like, such as general or special purpose microprocessors operable to execute programming instructions or micro-control code associated with operation of refrigerator appliance 100. In some embodiments, the processor executes programming instructions stored in memory. For example, the instructions may be software or any set of instructions that when executed by the processing device, cause the processing device to perform operations. Alternatively, controller 170 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 170 may be positioned in a variety of locations throughout refrigerator appliance 100. In the illustrated embodiment of FIG. 1, controller 170 is located within the user interface panel 140. In other embodiments, controller 170 may be positioned at any suitable location within refrigerator appliance 100, such as for example within a fresh food chamber, a freezer door, etc. Input/output ("I/O") signals may be routed between controller 170 and various operational components of refrigerator appliance 100. For example, user interface panel 140 may be in communication with controller 170 via one or more signal lines or shared communication busses.

Refrigerator appliance 100 also includes features for generating heated water and directing such heated water to dispenser 114. Thus, refrigerator appliance 100 need not be connected to a residential hot water heating system in order to supply heated water to dispenser 114. Generally, as will be explained in detail below, heated water dispensed by dispenser 114 can be used to boil eggs via an egg boiler device 200. As depicted in FIG. 1, egg boiler device 200 can be received within dispenser recess 168, and when egg boiler device 200 is properly positioned, a predetermined volume of heated water can flow into egg boiler device 200. The heater water boils the eggs within egg boiler device 200. Once boiled or cooked to the desired level, egg boiler device 200 can be removed from dispenser recess 168 and the eggs can be removed from egg boiler device 200.

Figure 2:
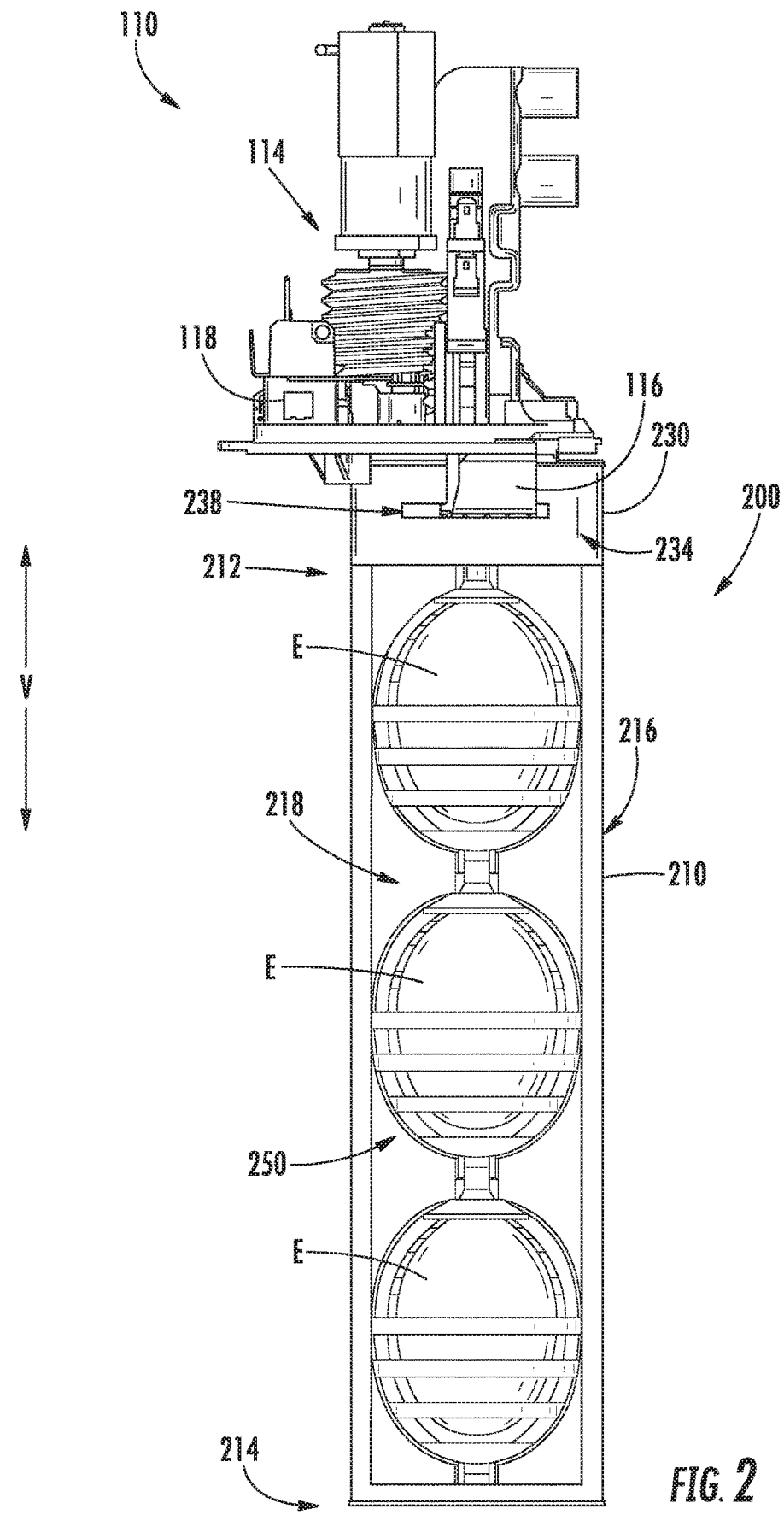
FIG. 2 provides a close up side view of an egg boiler device mounted to a dispensing assembly of the refrigerator appliance of FIG. 1.
Figure 3:
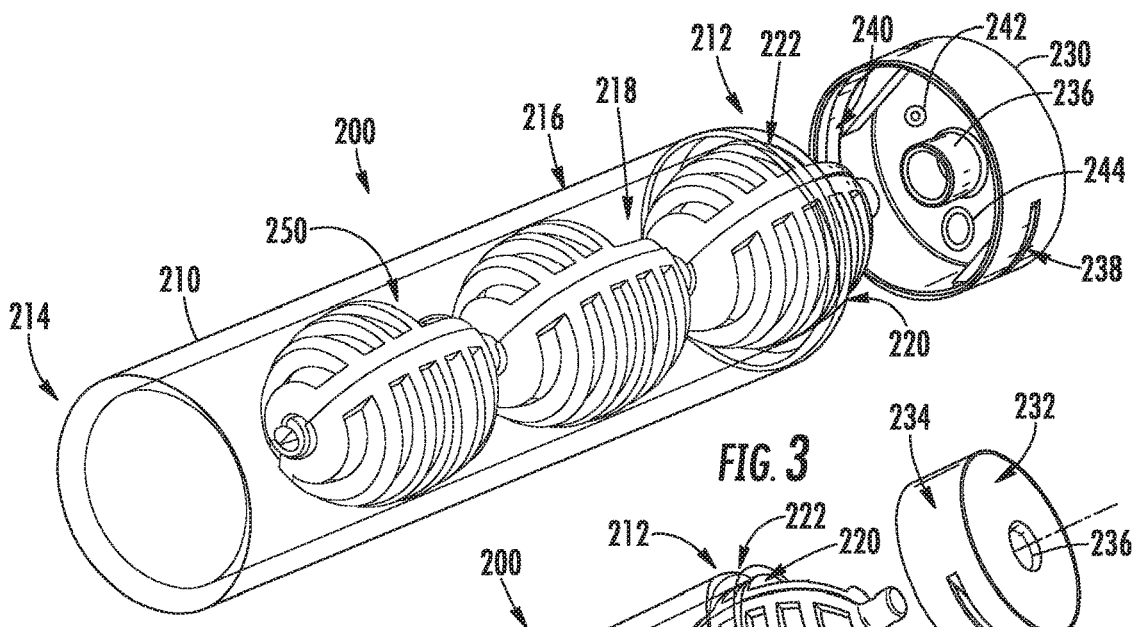
FIG. 3 provides a perspective view of the egg boiler device of FIG. 2.
Figure 4:
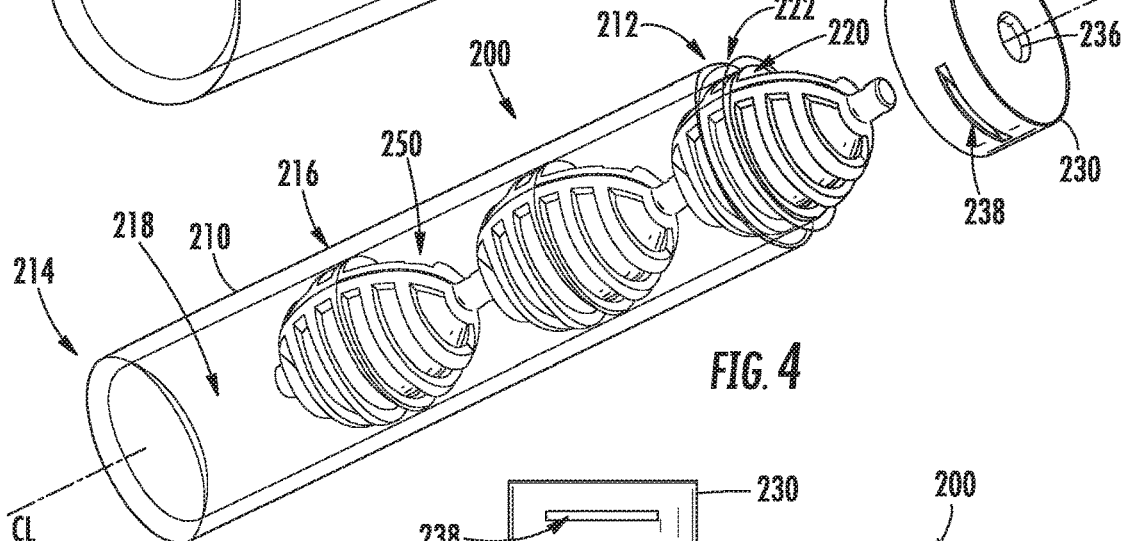
FIG. 4 provides another perspective view of the egg boiler device of FIG. 2.
Figure 5:
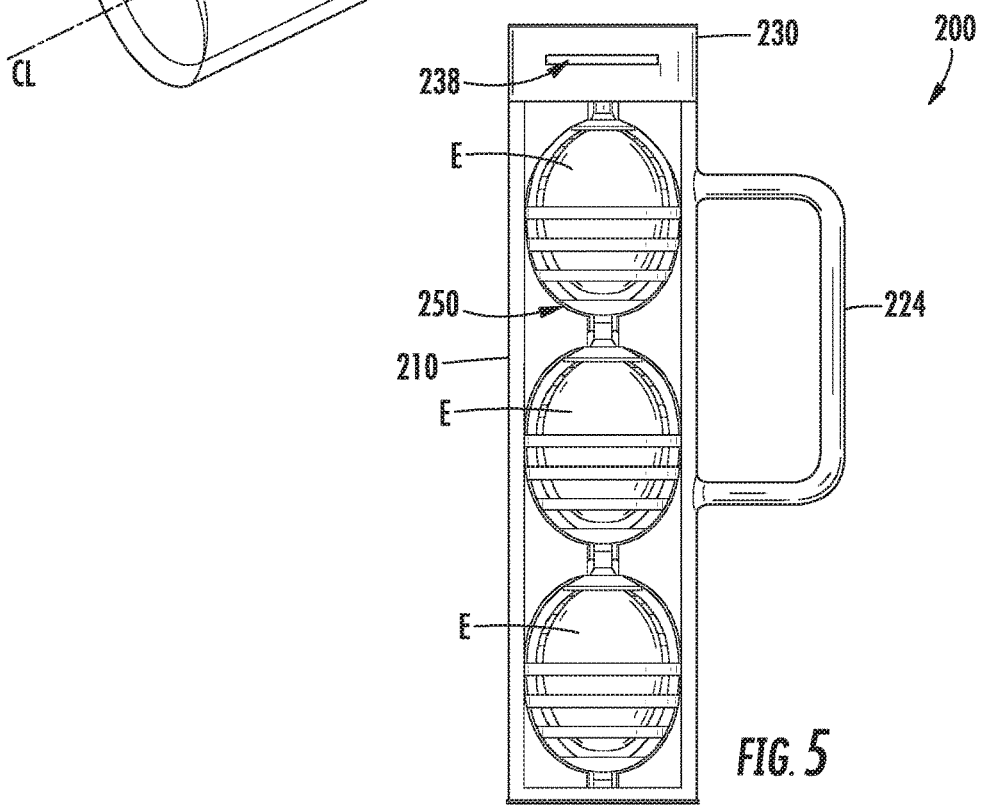
FIG. 5 provides an elevation view of the egg boiler device of FIG. 2 with an alternative canister having a handle.

FIGS. 2, 3, and 4 provide various views of egg boiler device 200. Particularly, FIG. 2 provides a close up side view of egg boiler device 200 mounted to dispensing assembly 110 and FIG. 3 and FIG. 4 provide perspective views of egg boiler device 200. As depicted, egg boiler device 200 includes a canister 210 and an end cap 230 that is removably connectable to canister 210. Canister 210 is generally cylindrical and can be transparent as shown in FIGS. 2, 3, and 4. In other embodiments, canister 210 can be non-transparent or opaque. Canister 210 extends between a first end 212 and a second end 214, e.g., along the vertical direction V. For this example embodiment, first end 212 of canister 210 is a top end and second end 214 is a bottom end of canister 210. Canister 210 defines an interior volume 218. Interior volume 218 is defined so that one or more eggs E can be received therein, e.g., as shown in FIGS. 2, 3, and 4. Moreover, canister 210 has one or more thermally insulated walls 216 in this example embodiment. In this manner, when heated water is disposed within interior volume 218, a user may still readily handle or touch canister 210. Canister 210 also defines an opening 220, e.g., at first end 212, that allows eggs E to be moved into and out of canister 210. Canister 210 also has threads 222 that can threadingly engage threads 240 of end cap 230, e.g., to secure end cap 230 to canister 210. In some embodiments, optionally, canister 210 includes a handle 224 as shown in FIG. 5. Handle 224 can facilitate handling of canister 210. In some embodiments, handle 224 is formed of a thermally insulating or low thermal conductive material.

As further shown in FIGS. 2, 3, and 4, as noted above, egg boiler device 200 includes end cap 230. End cap 230 has a top wall 232 and a sidewall 234 extending from top wall 232. When end cap 230 is oriented longitudinally or lengthwise along the vertical direction V, top wall 232 is generally orthogonal to the vertical direction V and sidewall 234 extends from top wall 232 downward along the vertical direction V. Sidewall 234 extends circumferentially around a centerline CL defined by egg boiler device 200. End cap 230 includes a port 236 through which water may enter and exit egg boiler device 200. Thus, for this embodiment, port 236 defines an inlet and an outlet to egg boiler device 200. For instance, heated water dispensed by dispensing assembly 110 can enter egg boiler device 200 through port 236 and can fill into the interior volume 218 of canister 210. Furthermore, water can exit egg boiler device 200 through port 236, e.g., when removed from beneath dispensing assembly 110 and/or during a cooking operation.

In addition, end cap 230 defines a pair of slots 238. More particularly, an exterior surface of sidewall 234 defines the slots 238 on opposing sides thereof. That is, the slots 238 are defined radially opposite one another. The slots 238 extend circumferentially and longitudinally along a direction orthogonal to the vertical direction V (e.g., as shown in FIG. 2). Each slot 238 is configured to receive a mounting tab 116 of dispensing assembly 110. In this way, egg boiler device 200 can be mounted to dispensing assembly 110. Further, end cap 230 includes threads 240 along an interior surface of sidewall 234. As noted above, threads 240 of end cap 230 can certainly engage with threads 222 of canister 210, e.g., to secure end cap 230 to canister 210.

For this embodiment, end cap 230 includes a magnet 242 mounted to or embedded within end cap 230. For instance, in some embodiments, magnet 242 can be mounted to or embedded within a second or bottom surface of top wall 232. In other embodiments, magnet 242 can be mounted to or embedded within the interior surface of sidewall 234. Magnet 242 can be used to detect the presence of egg boiler device 200 within dispensing recess 168 (FIG. 1) beneath dispensing assembly 110. More specifically, dispensing assembly 110 can include a proximity sensor 118. Proximity sensor 118 can be a hall sensor, for example. Proximity sensor 118 can be mounted to a bracket or some other suitable component of dispenser 114. Proximity sensor 118 is operable to detect magnet 242 of end cap 230 when magnet 242 is in a proximity range of proximity sensor 118. Proximity sensor 118 can be communicatively coupled with controller 170 (FIG. 1). Accordingly, when egg boiler device 200 is properly positioned in dispensing recess 168 beneath dispenser 114 and proximity sensor 118 detects magnet 242 within proximity range, proximity sensor 118 can output one or more signals (e.g., electrical signals) indicating that magnet 242 is within proximity range of proximity sensor 118. Controller 170 can control operation of refrigerator appliance 100, and more specifically dispenser 114, based at least in part on the received signals from proximity sensor 118. In some alternative embodiments, proximity sensor 118 can be mounted to or embedded within end cap 230 and magnet 242 can be mounted to a bracket or some other suitable component of dispensing assembly 110.

Furthermore, in some alternative embodiments, the presence of egg boiler device 200 can be detected by refrigerator appliance 100 in other suitable manners. For example, in some embodiments, refrigerator appliance 100 can include an optical sensor or other suitable sensor for sensing egg boiler device 200 when present in dispensing recess 168 (FIG. 1) beneath dispenser 114 (FIG. 1). In such embodiments, end cap 230 need not include magnet 242.

In some embodiments, such as the present example embodiment, end cap 230 can optionally include a temperature sensor 244. Temperature sensor 244 is operatively configured to sense a temperature of the water within egg boiler device 200. Temperature sensor 244 can be any suitable device operable to sense a temperature of the water within egg boiler device 200. Like proximity sensor 118, temperature sensor 244 is communicatively coupled with controller 170 (FIG. 1). Accordingly, temperature sensor 244 can output one or more signals indicative of a temperature of the water within egg boiler device 200. Controller 170 can control operation of refrigerator appliance 100, and more specifically dispenser 114, based at least in part on the received signals from temperature sensor 244. In some exemplary embodiments, temperature sensor 244 is a wireless sensor. In such embodiments, temperature sensor 244 is communicatively coupled with controller 170 wirelessly. In other exemplary embodiments, temperature sensor 244 can be communicatively coupled with controller 170 via one or more wired connections. For instance, when egg boiler device 200 is placed within dispenser recess 168 (FIG. 1), an electrical connector of end cap 230 can automatically connect with an electrical connector of dispensing assembly 110 to communicatively coupled temperature sensor 244 with controller 170.

Figure 6:
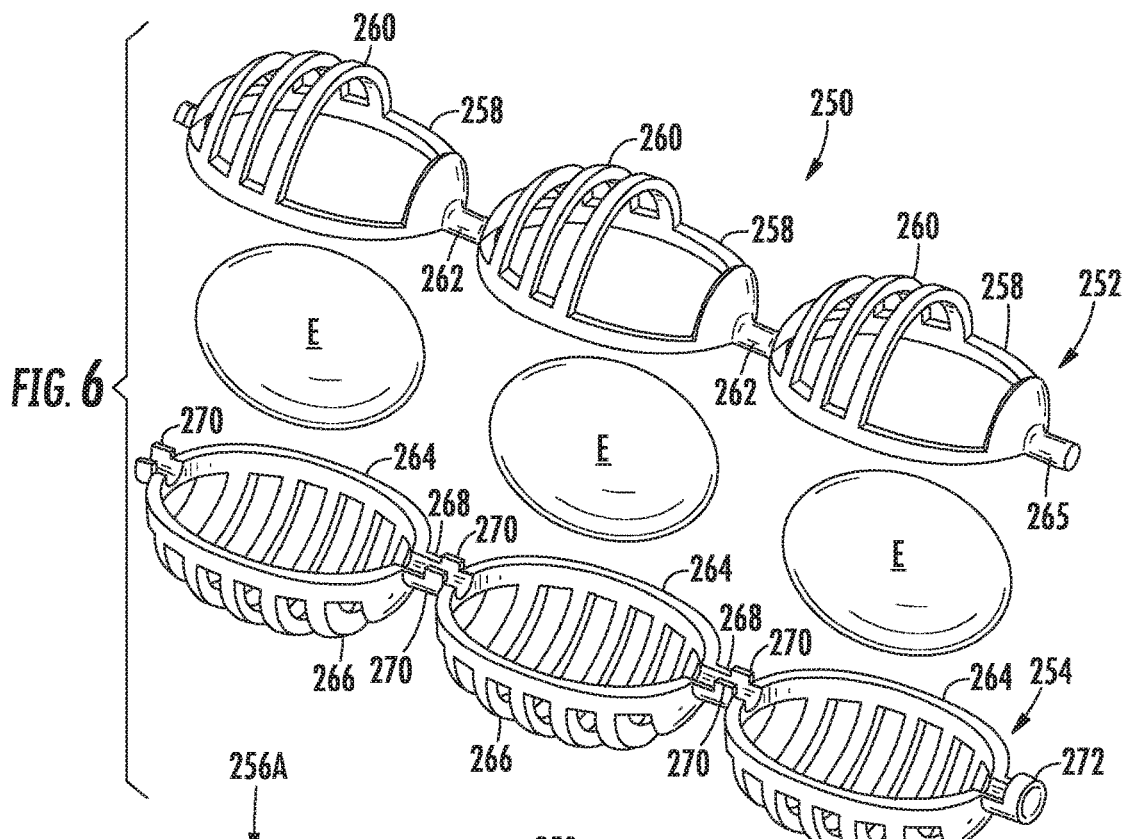
FIG. 6 provides an exploded perspective view of an egg tray of the egg boiler device of FIG. 2.
Figure 7:
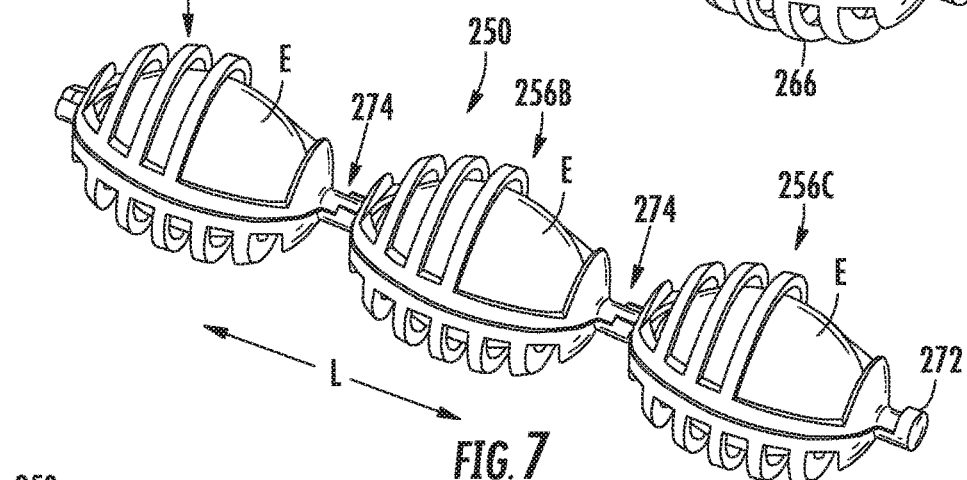
FIG. 7 provides a perspective view of the egg tray of FIG. 6.
Figure 8:
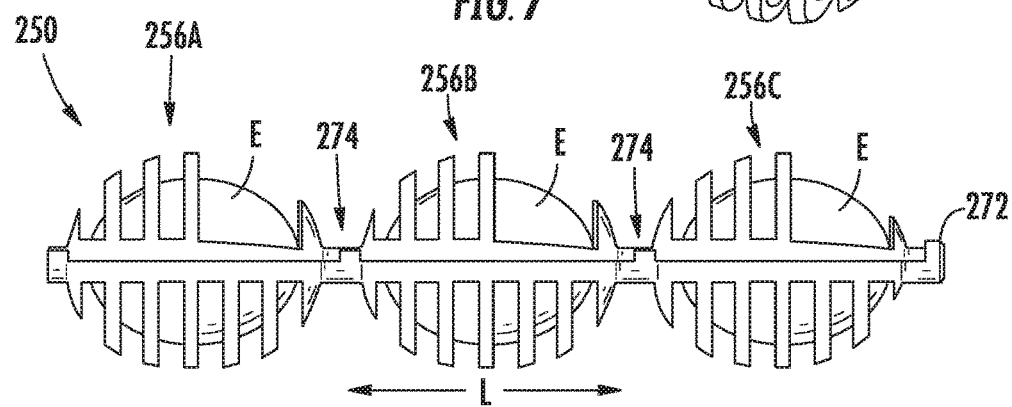
FIG. 8 provides a side view of the egg tray of FIG. 6.

FIGS. 6, 7 and 8 provide various views of an egg tray 250 of egg boiler device 200. FIG. 6 provides an exploded perspective view of egg tray 250. FIG. 7 provides a perspective view of egg tray 250. FIG. 8 provides a side view of egg tray 250. For this embodiment, egg tray 250 includes a first cover 252 and a second cover 254. First cover 252 can be connected to or mated with second cover 254. When first cover 252 is connected to second cover 254 (e.g., as shown in FIGS. 7 and 8), one or more egg baskets are formed. For this example embodiment, a first egg basket 256A, a second egg basket 256B, and a third egg basket 256C are formed when first cover 252 is connected to second cover 254. Each egg basket 256A, 256B, 256C has a substantially oblate ellipsoid shape, or stated differently, an egg shape. As will be appreciated, egg tray 250 can include more or less than three egg baskets when assembled.

Each egg basket 256A, 256B, 256C is sized and configured to receive an egg E. An egg E may be cradled or secured within a given egg basket 256A, 256B, 256C by one or more wire frames of first cover 252 and second cover 254. As illustrated, for each egg basket 256A, 256B, 256C, first cover 252 has a base wire frame 258 and a plurality of hoop or arcuate wire frames 260. Notably, the arcuate wire frames 260 of first cover 252 are substantially evenly spaced and only extend along half the longitudinal length of their respective base wire frames 258 along a longitudinal direction L. In this way, a user can more easily view an egg E when the egg E is disposed within an egg basket and less materials are used. The base wire frames 258 of first cover 252 are serially connected by locking posts 262. Locking posts 262 are generally cylindrical.

Similarly, for each egg basket 256A, 256B, 256C, second cover 254 has a base wire frame 264 and a plurality of hoop or arcuate wire frames 266. For this embodiment, the arcuate wire frames 266 of second cover 254 are substantially evenly spaced from one another and extend along the entire longitudinal length of their respective base wire frames 264 along the longitudinal direction L. The base wire frames 266 of second cover 254 are serially connected by receiving posts 268 that each include snap catches 270. Further, at least one of the base wire frames 264 includes a lock 272 that is configured to receive a corresponding free post 265 of top cover 252. Free post 265 can be inserted into lock 272 to secure first cover 252 to second cover 254. In addition, when first cover 252 is connected to second cover 254, the locking posts 262 are snapped passed snap catches 270 into receiving posts 268 to form snap fit joints or snap fits 274. As depicted in FIGS. 2, 3, and 4, egg tray 250 along with eggs E disposed within the egg baskets thereof can be sized and configured to be received within interior volume 218 of canister 210.

Figure 9:
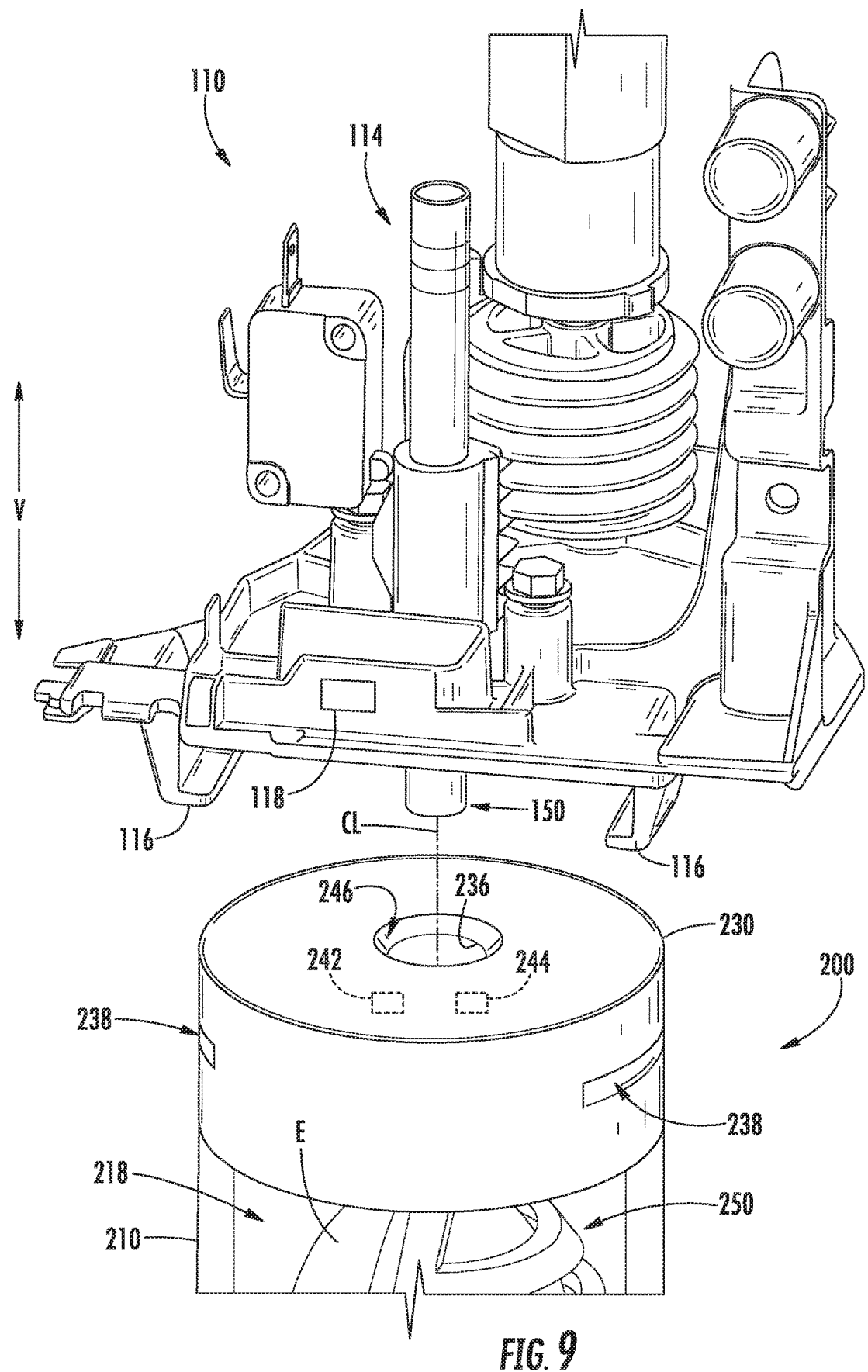
FIG. 9 provides a close up perspective view of the egg boiler device of FIG. 2 and the dispensing assembly of FIG. 1.
Figure 10:
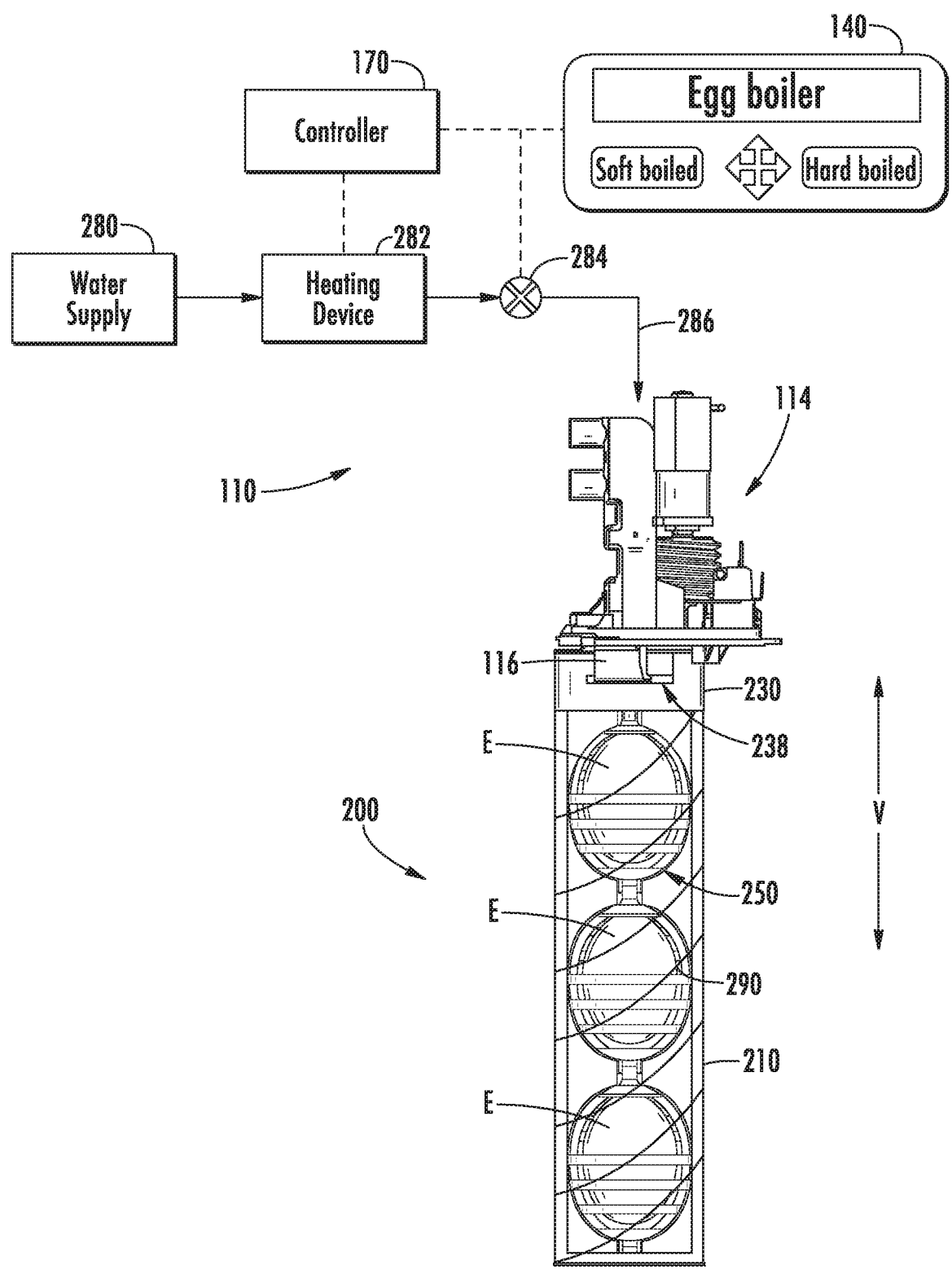
FIG. 10 provides a schematic view of the egg boiler device of FIG. 2 and the dispensing assembly of FIG. 1.

With reference now to FIGS. 1 through 10 generally and FIGS. 9 and 10 specifically, an example manner in which eggs can be cooked utilizing egg boiler device 200 will now be described. First, eggs E are loaded into egg tray 250. Particularly, the eggs E are loaded into second cover 254 (or first cover 252) and then first cover 252 and second cover 254 are snapped together to secure or cradle the eggs E within their respective egg baskets 256A, 256B, 256C. The loaded egg tray 250 can then be placed into interior volume 218 of canister 210. End cap 230 can then be screwed onto canister 210 to close opening 220 of canister 210 and to secure end cap 2302 canister 210. Particularly, threads 240 of end cap 230 can threadingly engage threads 222 of canister 210 to secure end cap 230 to canister 210.

Next, egg boiler device 200 can be mounted to refrigerator appliance 100, or more particularly, to dispensing assembly 110 of refrigerator appliance 100. For this example embodiment, to mount egg boiler device 200 to dispensing assembly 110, egg boiler device 200 is positioned within dispenser recess 168 defined by refrigerator door 128 and mounting tabs 116 of a bracket of dispensing assembly 110 are inserted into slots 238 of end cap 230. The opposing mounting tabs 116 can be snapped into their respective slots 238 to secure egg boiler device 200 in place.

With egg boiler device 200 positioned in place within dispensing recess 168 beneath dispenser 114, proximity sensor 118 can detect that magnet 242 of end cap 230 is within proximity range. Proximity sensor 118 can output one or more signals indicating that magnet 242 is within proximity range of proximity sensor 118. Controller 170 can receive the one or more signals and control operation of refrigerator appliance 100, and more specifically dispenser 114, based at least in part on the signals received from proximity sensor 118. Stated another way, controller 170 can determine one or more control commands based at least in part on the signals received from proximity sensor 118.

For instance, controller 170 can cause a heated water line 150 of dispenser 114 to move downward along the vertical direction V toward egg boiler device 200 based at least in part on the one or more control commands determined by controller 170 and routed to dispenser 114, or more particularly, a motor of dispenser 114. When move downward along the vertical direction V, heated water line 150 can be received at least in part by port 236 of end cap 230. Port 236 can include a tapered surface 246 to facilitate insertion of heated water line 150 into port 236. By ensuring that heated water line 150 is positioned at least in part in port 236 of end cap 230, heated water is prevented from spilling.

Moreover, controller 170 can cause user interface panel 140 to prompt a user to decide whether the eggs are to be cooked in a "soft boiled" or a "hard boiled" cooking mode based at least in part on the one or more control commands determined by controller 170 and routed to user interface panel 140. The temperature of the heated water directed into egg boiler device 200 and the cooking time may be set by controller 170 in accordance with the selected cooking mode. In some embodiments, controller 170 can automatically select the cooking mode in which the eggs are to be cooked, e.g., based on a user selected default and lack of a user input within a predetermined time from when controller 170 receives signals indicating that egg boiler device 200 is present beneath dispenser 114.

With the cooking mode selected, by a user input or automatically, controller 170 can cause a water heater or heating device 282 of refrigerator appliance 100 to heat water from a water supply 280 based at least in part on the one or more control commands determined by controller 170 and routed to heating device 282. That is, heating device 282 is turned on. Thus, heating device 282 is communicatively coupled with controller 170. Heating device 282 can be an electric resistance-heating element or some other suitable heating element capable of raising the temperature of water.

Water supply 280 can be a municipal water line or water stored and filtered by refrigerator appliance 100, for example. Controller 170 can cause heating device 282 to heat water until the water reaches a predetermined temperature. In some embodiments, controller 170 can cause heating device 282 to heat water for a predetermined time. In yet other embodiments, controller 170 can cause heating device 282 to heat water until the water reaches a predetermined temperature or for a predetermined time, whichever one occurs first.

After heating device 282 heats the water from water supply 280 to a predetermined temperature or for a predetermined time, controller 170 can cause an inlet valve 284 to open or move to an open position such that the heated water is directed to dispenser 114 and ultimately to egg boiler device 200. More specifically, when controller 170 causes inlet valve 284 to open, heated water flows to dispenser 114 and is dispensed via heated water line 150 into port 236 of end cap 230 and ultimately to interior volume 218 of canister 210. A predetermined volume of heated water can be dispensed into interior volume of canister 210. In some embodiments, controller 170 can control the volume of heated water directed to egg boiler device 200 by keeping the inlet valve 284 open for a predetermined time. Alternatively, controller 170 can receive one or more sensor outputs indicative of the flow rate through inlet valve 284. The sensed outputs can be received from a flow rate sensor, for example. Thus, controller 170 can cause a predetermined volume of heated water to be directed to egg boiler device 200. Water supply 280, heating device 282, inlet valve 284, and dispenser 114 are in fluid communication via conduit 286.

When the predetermined volume of heated water is directed into interior volume 218 of canister 210, controller 170 can cause inlet valve 284 to close or move to a closed position to prevent the flow of heated water to egg boiler device 200. In some embodiments, controller 170 can also cause heating device 282 to turn off or stop heating water from water supply 280. In yet other embodiments, heating device 282 can remain on for the duration of the cooking operation, e.g., so that additional heated water can be directed to egg boiler device 200. Controller 170 can keep heating device 282 on or turn off heating device 282 based at least in part on the number of eggs being cooked during the cooking operation. Controller 170 can receive a user input indicative of the number of eggs being cooked in the cooking operation, for example.

In addition, upon opening inlet valve 284 or upon controller 170 closing inlet valve 284 after the predetermined volume of heated water is directed to egg boiler device 200, controller 170 can cause a timer (e.g., a timer onboard controller 170) to keep or maintain the time duration of the egg boiling cooking operation. The timer can count upwards or be a countdown timer. The heated water disposed in interior volume 218 imparts heat or thermal energy to the eggs E secured by egg tray 250. The eggs E can be soft boiled or hard boiled depending on the duration the heated water thermally interacts with the eggs E.

In some instances during the egg boiling cooking operation, additional heated water can be directed to egg boiler device 200, e.g., to maintain or increase the temperature of the water within egg boiler device 200. In some embodiments, during the cooking operation, temperature sensor 244 can monitor the temperature of the heated water within egg boiler device 200 (e.g., continuously or at a predetermined interval) and one or more signals indicative of the temperature of the water within egg boiler device 200 can be routed to and received by controller 170. Accordingly, temperature sensor 244 can be used to detect the drop in temperature of the water inside egg boiler device 200. During the egg boiling process, heat energy from the water transfer to the eggs as well as to surrounding atmosphere. Therefore, during the egg boiling process, the temperature of the water inside egg boiler device 200 drops at different rates based on the number of eggs inside egg boiler device 200 as well as the atmospheric temperature around egg boiler device 200 (atmospheric temperature and wind velocity varies during different seasons of the year). A drop in temperature of the water may result in partial boiling of eggs; thus, the eggs may not be cooked as per user requirement. To avoid partially boiling eggs with egg boiler device 200, temperature sensor 244 can monitor the temperature of water vs time. As the cooking time required to cook eggs at different levels is known, the eggs can be accurately cooked using sensed outputs from temperature sensor 244.

Accordingly, based on real time temperature vs time data, heating device 282 can be switched on and water heated by heating device 282 can be directed to egg boiler device 200 to increase the water temperature therein. Particularly, when the temperature of the water within egg boiler device 200 has passed a predetermined temperature threshold (e.g., decreased below the boiling temperature of water), controller 170 can cause inlet valve 284 to open or move to the open position such that heated water is directed to dispenser 114 and ultimately to egg boiler device 200. More specifically, when controller 170 causes inlet valve 284 to open, heated water flows to dispenser 114 and is dispensed via heated water line 150 into port 236 of end cap 230 and ultimately to interior volume 218 of canister 210. Thus, a second volume of heated water can be dispensed into egg boiler device 200.

In some instances, the second volume of heated water is simply added to the initially dispensed volume of heated water that has cooled over time to increase or maintain the temperature of the water within egg boiler device 200. In such instances, the volume of the initially dispensed heated water should be selected such interior volume 218 of canister 210 can receive one or more additional volumes of heated water. In embodiments in which canister 210 of egg boiler device 200 does not have sufficient volume for an additional volume of heated water, egg boiler device 200 can include a flexible heater 290 (e.g., a resistance heater embedded or attached to canister 210) that can be switched on to avoid heat loss to the surrounding air or to reheat the water in egg boiler. Flexible heater 290 can receive electrical power by contacting a connector on dispensing 114 when the egg boiler device 200 is positioned within dispenser recess 168.

In some other instances, the second volume of heated water can displace at least a portion of the initially dispensed, relatively cooler water in egg boiler device 200 through port 236 and ultimately to a drain line (not shown). The second volume of heated water dispensed into egg boiler device 200 can increase or maintain the temperature of the water therein, thus providing enhanced egg-cooking performance.

The second volume of heated water can be a second predetermined volume of heated water. In some embodiments, controller 170 can control the volume of the second volume of heated water directed to egg boiler device 200 by keeping the inlet valve 284 open for a predetermined time. Alternatively, controller 170 can receive one or more sensor outputs indicative of the flow rate through inlet valve 284 and the inlet valve 284 can be closed at the appropriate time based on the flow rate. The sensed outputs can be received from a flow rate sensor, for example. Thus, controller 170 can cause a second predetermined volume of heated water to be directed to egg boiler device 200. It will be appreciated that subsequent predetermined volumes of heated water can be directed to egg boiler device 200 in the same manner as noted above with respect to the second predetermined volume of heated water.

In some other embodiments, during the cooking operation, one or more additional volumes of heated water can be dispensed into egg boiler device 200 based at least in part on a predetermined time threshold (or multiple predetermined time thresholds). As noted above, a timer can keep or maintain the time of a cooking operation. When the current time of the cooking operation passes a predetermined time threshold, e.g., twelve minutes (12 min.), controller 170 can cause inlet valve 284 to open or move to the open position such that heated water is directed to dispenser 114 and ultimately to egg boiler device 200. Thus, a second volume of heated water can be dispensed into egg boiler device 200. The second volume of heated water can displace at least a portion of the initially dispensed, relatively cooler water in egg boiler device 200 through port 236 and ultimately to a drain line (not shown). The second volume of heated water dispensed into egg boiler device 200 can increase or maintain the temperature of the water therein, thus providing enhanced egg-cooking performance. As noted above, the second volume (and any subsequent dispensed volumes) can be predetermined volumes of heated water.

In some embodiments, the predetermined time threshold or thresholds can be set based at least in part on the number of eggs being cooked in the cooking operation. That is, the predetermined time threshold can be varied based at least in part on the number of eggs being cooked in the cooking operation. As one example, a user can provide a user input, e.g., to user interface panel 140, indicating the number of eggs being cooked in the cooking operation. Other suitable manners to determine the number of eggs being cooked in the cooking operation are contemplated. For instance, a camera of refrigerator appliance 100 can capture one or more images of egg boiler device and controller 170 can determine the number of eggs being cooked in egg boiler device 200.

In some embodiments, at the end of the cooking operation, controller 170 can cause inlet valve 284 to open or move to the open position such that relatively cool water is directed to dispenser 114 and ultimately to egg boiler device 200. More specifically, when controller 170 causes inlet valve 284 to open, a relatively cool volume of water flows to dispenser 114 and is dispensed via heated water line 150 into port 236 of end cap 230 and ultimately to interior volume 218 of canister 210. The volume of relatively cool water can be room temperature water or chilled water, for example. The volume of relatively cool water can displace at least a portion of the heated water in egg boiler device 200 through port 236 and ultimately to a drain line (not shown). In this way, walls 216 and/or handle 224 may be cooled, which allows a user to more easily handle egg boiler device 200 immediately after the cooking operation. In some embodiments, the volume of relatively cool water can displace the entire volume of heated water in egg boiler device 200 through port 236. The relatively cool water is cool relative to the heated water. Further, in such embodiments, if heating device 282 is kept on during the cooking operation, controller 170 can cause heating device 282 to turn off or deactivate within a predetermined time of an end time of the cooking operation. In this way, the water from water supply 280 can be allowed to cool. Accordingly, when inlet valve 284 is opened at the end of the cooking operation, the water dispensed to egg boiler device 200 is cool relative to the water in the egg boiler device 200.

Further, at the end of the cooking operation, controller 170 can cause a speaker of user interface panel 140 or refrigerator appliance 100 more generally to present a notification that alerts a user that his or her eggs E are finished cooking. As one example, controller 170 can send one or more control commands (e.g., electrical signals) to the speaker, which can generate an audible alert. Additionally or alternatively, controller 170 can cause a display device of user interface panel 140 to visually indicate to the user that his or her eggs E are finished cooking.

A user can remove egg boiler device 200 by removing mounting tabs 116 from slots 238 of end cap 230. To access the cooked eggs E, a user may unscrew or twist off end cap 230 from canister 210. Then, a user may pull out egg tray 250 with the boiled eggs E cradled therein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of cooking eggs at a refrigerator appliance in a cooking operation, the method comprising:
   detecting an egg boiler device mounted within a dispenser recess of the refrigerator appliance, the egg boiler device being mounted within the dispenser recess without need to open a door of the refrigerator appliance, the egg boiler device having one or more eggs loaded therein; and
   in response to detecting the egg boiler device within the dispenser recess, directing a volume of heated water into the egg boiler device such that the volume of heated water imparts thermal energy to the one or more eggs loaded into the egg boiler device.

2. The method of claim 1, wherein detecting the egg boiler device mounted within the dispenser recess of the refrigerator appliance comprises:
   receiving, by a controller of the refrigerator appliance from a proximity sensor, one or more signals indicating whether the egg boiler device is mounted within the dispenser recess; and
   determining, by the controller, whether the egg boiler device is mounted within the dispenser recess based at least in part on the one or more signals; and
   when the controller determines that the egg boiler device is mounted within the dispenser recess based at least in part on the one or more signals, causing, by the controller, an inlet valve to open such that the volume of heated water heated by a heating device is directed into the egg boiler device.

3. The method of claim 2, wherein proximity sensor is mounted to the refrigerator appliance and a magnet is mounted to the egg boiler device, wherein the one or more signals indicate that the egg boiler device is mounted within the dispenser recess when the proximity sensor detects the magnet of the egg boiler device within a proximity range of the proximity sensor.

4. The method of claim 2,
   wherein the controller causes the inlet valve to open only if the volume of heated water is heated to a predetermined temperature or has been heated by the heating device for a predetermined time.

5. The method of claim 1, wherein the volume of heated water directed into the egg boiler device is a predetermined volume of heated water.

6. The method of claim 1, further comprising:
   directing a second volume of heated water into the egg boiler device.

7. The method of claim 6, further comprising:
   receiving, by a controller of the refrigerator appliance from a temperature sensor, one or more signals indicating a temperature of the volume of heated water within the egg boiler device;
   determining, by the controller, whether the temperature has passed a predetermined temperature threshold, and
   wherein when the temperature has passed the predetermined temperature threshold, the second volume of heated water is directed into the egg boiler device.

8. The method of claim 6, further comprising:
   receiving, by the controller, a current time of the cooking operation;
   determining, by the controller, whether the current time has passed a predetermined time threshold, and
   wherein when the current time has passed the predetermined time threshold, the second volume of heated water is directed into the egg boiler device.

9. The method of claim 8, further comprising:
   receiving, by the controller, an input indicative of a number of eggs loaded into the egg boiler device;
   setting, by the controller, the predetermined time threshold based at least in part on the number of eggs loaded into the egg boiler device.

10. The method of claim 1, further comprising:
    deactivating, by the controller, the heating device within a predetermined time of an end time of the cooking operation; and
    directing a volume of relatively cool water into the egg boiler device such that the volume of relatively cool water displaces the volume of heated water within the egg boiler device, the volume of relatively cool water being cooler than the volume of heated water.

11. The method of claim 1, further comprising:
    causing, by the controller, a notification to be presented to a user that indicates the one or more eggs loaded into the egg boiler device are finished cooking.

12. The method of claim 1, further comprising:
    mounting the egg boiler device within the dispenser recess of the refrigerator appliance, wherein the mounting comprises inserting mounting tabs of a dispenser assembly into slots defined by an end cap of the egg boiler device.

13. The method of claim 12, further comprising:
    moving a heated water line of a dispenser downward so that the water line is received at least in part within a port defined by an end cap of the egg boiler device.

14. The method of claim 12, wherein when the egg boiler device is mounted within the dispenser recess, an electrical connector of the end cap automatically connects with an electrical connector of the dispensing assembly to communicatively couple a temperature sensor of the end cap with a controller of the refrigerator appliance.

15. The method of claim 1, further comprising:
reheating the volume of heated water disposed within a canister of the egg boiler device with a flexible heater attached or embedded within the canister.

16. The method of claim 1, wherein the egg boiler device has a canister and an egg tray receivable within an interior volume of the canister, and wherein the method further comprises:
positioning the one or more eggs in respective egg baskets of the egg tray, the egg baskets being formed by a plurality of arcuate wire frames spaced from one another; and
positioning the egg tray within the interior volume of the canister of the egg boiler device.

17. The method of claim 16, wherein the egg baskets of the egg tray are snap fit together.

18. The method of claim 1, wherein the egg boiler device has a canister defining an interior volume and an egg tray removably mounted in the interior volume of the canister, the egg tray having a first cover and a second cover removably connected with the first cover to form one or more egg baskets in which the one or more eggs are secured.

19. The method of claim 18, wherein the first cover and the second cover are snapped together to secure the one or more eggs in respective ones of the one or more egg baskets.

20. A refrigerator appliance, comprising:
a cabinet defining a chilled chamber;
a door mounted to the cabinet, the door defining a dispenser recess accessible without need to open the door;
a dispenser mounted to the door;
a heating device disposed within the cabinet for heating water;
an egg boiler device containing one or more eggs, the egg boiler device positioned within the dispenser recess and mounted to the dispenser such that a volume of heated water from the heating device is receivable within the egg boiler device to impart thermal energy to the one or more eggs; and
a controller configured to:
receive one or more signals indicating that the egg boiler device has been mounted within the dispenser recess of the refrigerator appliance, the egg boiler device having the one or more eggs loaded therein; and
in response to detecting the egg boiler device within the dispenser recess, cause a volume of heated water to be directed into the egg boiler device such that the volume of heated water imparts thermal energy to the one or more eggs loaded into the egg boiler device.

\* \* \* \* \*